United States Patent
Narasimhan

(10) Patent No.: US 10,838,815 B2
(45) Date of Patent: Nov. 17, 2020

(54) FAULT TOLERANT AND DIAGNOSTIC BOOT

(71) Applicant: DELL PRODUCTS L.P., Round Rock, TX (US)

(72) Inventor: Krishnakumar Narasimhan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 114 days.

(21) Appl. No.: 16/135,115

(22) Filed: Sep. 19, 2018

(65) Prior Publication Data

US 2020/0089571 A1 Mar. 19, 2020

(51) Int. Cl.
*G06F 11/14* (2006.01)
*G06F 9/4401* (2018.01)
*G06F 11/07* (2006.01)

(52) U.S. Cl.
CPC ........ *G06F 11/1417* (2013.01); *G06F 9/4403* (2013.01); *G06F 11/0757* (2013.01); *G06F 9/4401* (2013.01); *G06F 2211/1097* (2013.01)

(58) Field of Classification Search
CPC ............... G06F 9/4401; G06F 11/1417; G06F 11/0757; G06F 9/4403; G06F 2211/1097
USPC .......................................... 713/1, 2; 714/55
See application file for complete search history.

(56) References Cited

U.S. PATENT DOCUMENTS

| | | | |
|---|---|---|---|
| 5,099,485 A | 3/1992 | Bruckert et al. | |
| 6,205,561 B1 * | 3/2001 | Santerre | G06F 11/0769 713/1 |
| 6,205,565 B1 | 3/2001 | Bissett et al. | |
| 6,807,643 B2 * | 10/2004 | Eckardt | G06F 11/2284 713/2 |
| 6,836,859 B2 | 12/2004 | Berg et al. | |
| 9,171,417 B2 | 10/2015 | Gangner et al. | |
| 2002/0095619 A1 | 7/2002 | Marsh | |
| 2013/0290778 A1 * | 10/2013 | Soderlund | G06F 11/1417 714/15 |
| 2014/0281450 A1 * | 9/2014 | Friedman | G06F 9/4401 713/2 |
| 2018/0275731 A1 * | 9/2018 | Engler | G06F 1/24 |
| 2019/0278651 A1 * | 9/2019 | Thornley | G06F 11/0757 |
| 2020/0034237 A1 * | 1/2020 | Suryanarayand | G06F 11/0709 |

FOREIGN PATENT DOCUMENTS

| | | |
|---|---|---|
| CN | 103438920 | 12/2013 |
| EP | 0632379 | 8/2004 |
| GB | 2318658 A | 4/1998 |
| GB | 2366012 | 2/2002 |
| JP | 6069951 B2 | 2/2017 |

* cited by examiner

*Primary Examiner* — Ji H Bae
(74) *Attorney, Agent, or Firm* — Jackson Walker LLP; Christopher J. Rourk

(57) ABSTRACT

A method for processing data is provided that includes starting a processor from an off state and loading watchdog timer handler code into a processor memory. Executing the watchdog timer handler code and determining whether a catastrophic error has occurred during execution of the watchdog timer handler code. Invoking a system management module to update error code if it is determined that the catastrophic error has occurred and invoking a first phase dispatcher to set up a first stack frame associated with a first phase if it is determined that a catastrophic error has not occurred.

20 Claims, 4 Drawing Sheets

FAULT TOLERANT AND DIAGNOSTIC BOOT

TECHNICAL FIELD

The present disclosure relates generally to processor operations, and more specifically to a system and method for fault tolerant and diagnostic boot of a processor.

BACKGROUND OF THE INVENTION

When a processor encounters errors during start-up, it typically results in catastrophic error. If the start-up processor does not get to the boot stage, the error may be irrecoverable.

SUMMARY OF THE INVENTION

A method for processing data is provided that includes starting a processor from an off state and loading watchdog timer handler code into a processor memory. The watchdog timer handler code is then executed and it is determined whether a catastrophic error has occurred during execution of the watchdog timer handler code. A system management module is invoked to update error code if it is determined that the catastrophic error has occurred, and a first phase dispatcher is invoked to set up a first stack frame associated with a first phase if it is determined that a catastrophic error has not occurred.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
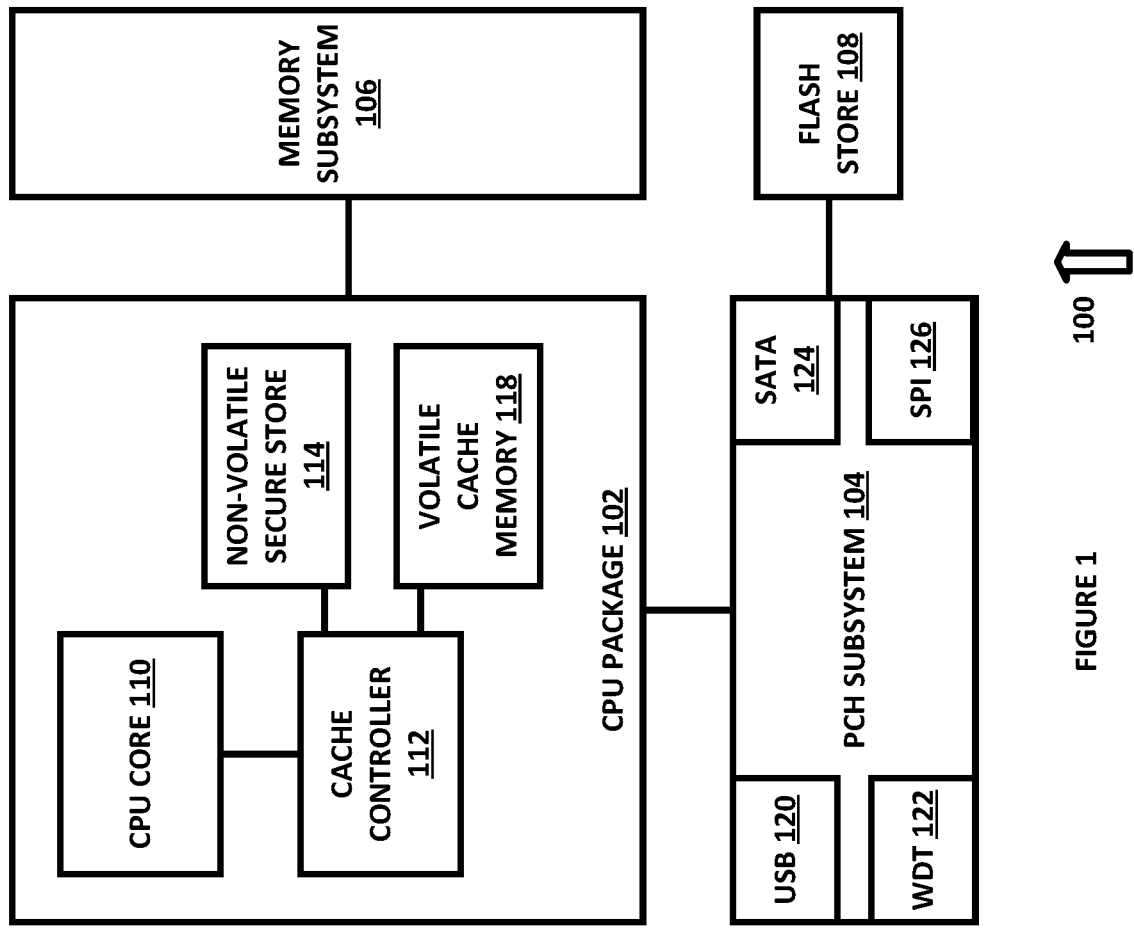
FIG. 1 is a diagram of a system for providing a fault tolerant and diagnostic boot, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

A processor generally refers to a central processing unit (CPU) core, which is a highly structured integrated device that is implemented in silicon, and which includes a logic stack and arithmetic logic unit (ALU) that performs the logical operations specified in the stack on the data that is also in the stack or that is located at a memory address location. Processor reliability and fault tolerance requires processors to be able to recover from errors during boot due to the ageing of components, faulty components, erroneous software or other causes. The robustness of the processor is measured by its ability to recover from these errors and boot reliably. The processor firmware works in co-ordination with the processor operating system to detect, identify and analyze errors, correct the error condition if possible, and to report the error for supervisory control and appropriate action where necessary. However, errors that occur during system boot-up, such as a firmware driver failure, are challenging to detect and recover from. The processor may eventually be reset due to such errors, resulting in longer boot times or a total failure to boot. The present disclosure can be used to recover and analyze the failure on the same boot, such as by utilizing the processor stack with the watchdog timer to recover from the failing state.

In particular, during the power on of the processor, the firmware initializes and sets up a cache in random access memory (RAM), and then loads silicon initialization modules in the cache. The processor then proceeds to detect system memory and to provide a rich environment for loading and executing the silicon initialization modules and subsequent modules. A number of firmware modules are used to initialize the system components and provide necessary resources, and the boot device is then identified for booting the system. The firmware modules can include a watchdog timer module that can be invoked by one or more of the hardware components upon expiry of the watchdog timer. The watchdog timer expiry can be due to a faulty execution of a module in a phase of execution, a stack corruption of the module or other causes. The firmware modules can also include a secure execution module such as system management mode (SMM) driver module. The system enters a secure mode for the execution of the drivers contained in the SMM driver module. One feature of SMM is that the drivers executing in this mode can be provided with access to some or all of the system resources, such as the memory devices, input/output (I/O) devices, the peripheral component interconnect (PCI) bus and so forth.

The system management module can be contained in a data memory device called the "store" that is located inside the processor, in a flash memory data memory device or in other suitable data memory storage devices. When the processor enters into the SMM, the platform resources are typically made available to the SMM software, which can execute algorithms that analyze the state of the hardware, and modify the state of the hardware if needed. One of the hardware components that are monitored can include system memory, and the SMM software provides a way to make modifications to the data that is stored in the system memory. The data in the system memory includes the raw data that is consumed by different executives, the functional code for the executives or other suitable data.

The watchdog timer module initializes the platform watchdog timer, which produces an interrupt to the processor upon expiry. The processor firmware initializes the timer during the initial load for a certain period, depending upon the phase and modules in execution. The timer is then updated upon completion of each phase. Upon receiving the interrupt, the processor pushes the current code segment and the instruction pointer into the stack segment and switches to an interrupt execution module. In the interrupt execution module, the present state of the system can be analyzed, recovery from errors can be implemented, and a state log can be made or updated.

During execution by the processor, the firmware causes the processor to sequentially invoke multiple executives that are contained within the firmware or stored in memory. The processor hardware facilitates storage of the context data associated with the executives by providing a stack segment register. The context data can include a return vector to the command that invoked the executive. The initial dispatcher or invoker creates a stack frame consisting of the signature, return code of the current module, and the return vector for the dispatcher in the memory. Thus, by locating the initial dispatcher of the modules in the stack and by carefully editing the current return vector, there is a possibility to return to the dispatcher. It is also possible to identify the dispatcher by walking up the stack segment (tracing the stack backwards from the current stack pointer), or in other suitable manners.

To successfully return to the dispatcher, the watchdog interrupt handler can locate its resumption vector by reading the stack. When the data at the resumption vector consists of an invalid opcode or a CPU dead loop, the watchdog interrupt handler can modify the machine opcode in the memory and include a code for successful return to the dispatcher. To achieve this function, the machine operational codes such as a jump (JMP) code, a call (CALL) code, a null operation (NoOP) code or other suitable operational code can be stored in a data execution protection (DEP) region of the processor memory, and this region can be made accessible to the watchdog interrupt handler. The opcodes can also be securely contained in the system management RAM (SMRAM) for modification of the return vector from the SMM handler, or can be stored in other suitable locations.

The watchdog interrupt handler can also identify the failure of the currently expiring module, under certain circumstances that have been previously identified and for which one or more failure identification algorithms have been provided. Data that identifies the failure of the currently expiring module is generated and stored in a pre-allocated shared memory region, and data that identifies the status of the currently expiring module is updated in the dispatcher stack frame. The watchdog interrupt handler modifies the return vector to return to the dispatcher for resuming the loading of further modules. In addition, data that defines the state of the currently expiring module is logged into a suitable permanent data store for further analysis.

In certain cases, the future modules waiting for execution can be selected as a function of the successful completion of a module that may have experienced an error. The dispatcher, upon gaining control, can discover any such modules and provide a minimal boot path and an alternate input/output (I/O) device to the operating system, or to a shell (such as a Unified Extensible Firmware Interface (UEFI) shell), to analyze the error and provide a suitable update. If the software of the erroneous module is in an irrecoverable state, a suitable notification (such as an annunciation to a system operator or an LED indication) can be made.

Certain processor systems can also implement a mechanism in which the executives are loaded into an isolated domain in which resources are contained, such as a system that is operating with virtualization technology or other suitable systems. As isolation domains are created using virtualization technology, some regions might not be accessible to all of the system software and devices. In these cases, an interrupt request (IRQ) handler such as watchdog timer may not be able to access a domain containing a device driver. In such circumstances, the SMM can be utilized to locate the dispatcher's or invoker's return vector and the processor-provided segment transition gates are utilized to identify and resume the system executive to the dispatcher. The SMM can be triggered from the watchdog timer handler using a write command to dedicated I/O ports, and the SMM handler can update the stack frame and the shared memory to capture the detailed status of the module that caused the error. The SMM method for resuming to the dispatcher can be utilized in those circumstances when the watchdog interrupt handler cannot access the segment of the modules with an error.

FIG. 1 is a diagram of a system 100 for providing a fault tolerant and diagnostic boot, in accordance with an example embodiment of the present disclosure. System 100 includes CPU package 102 (with CPU core 110, cache controller 112, non-volatile secure store 114 and volatile cache memory 118), PCH subsystem 104 (with USB 120, WDT 122, SATA 124 and SPI 126), memory subsystem 106 and flash store 108, each of which can be implemented in hardware or a suitable combination of hardware and software.

CPU package 102 includes separate components that are provided in a single assembly, such as CPU core 110, cache controller 112, non-volatile secure store 114, volatile cache memory 118 and other suitable components and devices. The components can include suitable firmware and other associated software, and can operate under control of that firmware and other suitable software instructions and data that is stored on memory subsystem 106, flash store 108 or other suitable components.

PCH subsystem 104 is a platform controller hub (PCH) that includes universal serial bus (USB) 120, watchdog timer (WDT) 122, serial AT attachment (SATA) 124, serial peripheral interface (SPI) 126, and other suitable components and devices. The components can include suitable firmware and other associated software, and can operate under control of that firmware and other suitable software instructions and data in accordance with the teachings of the present disclosure that is stored on memory subsystem 106, flash store 108 or other suitable components.

In operation, system 100 allows a fault tolerant and diagnostic boot process to be implemented that reduces or eliminates errors and misoperation. System 100 operates under algorithmic control, by using one or more of the algorithms disclosed herein.

Figure 2:
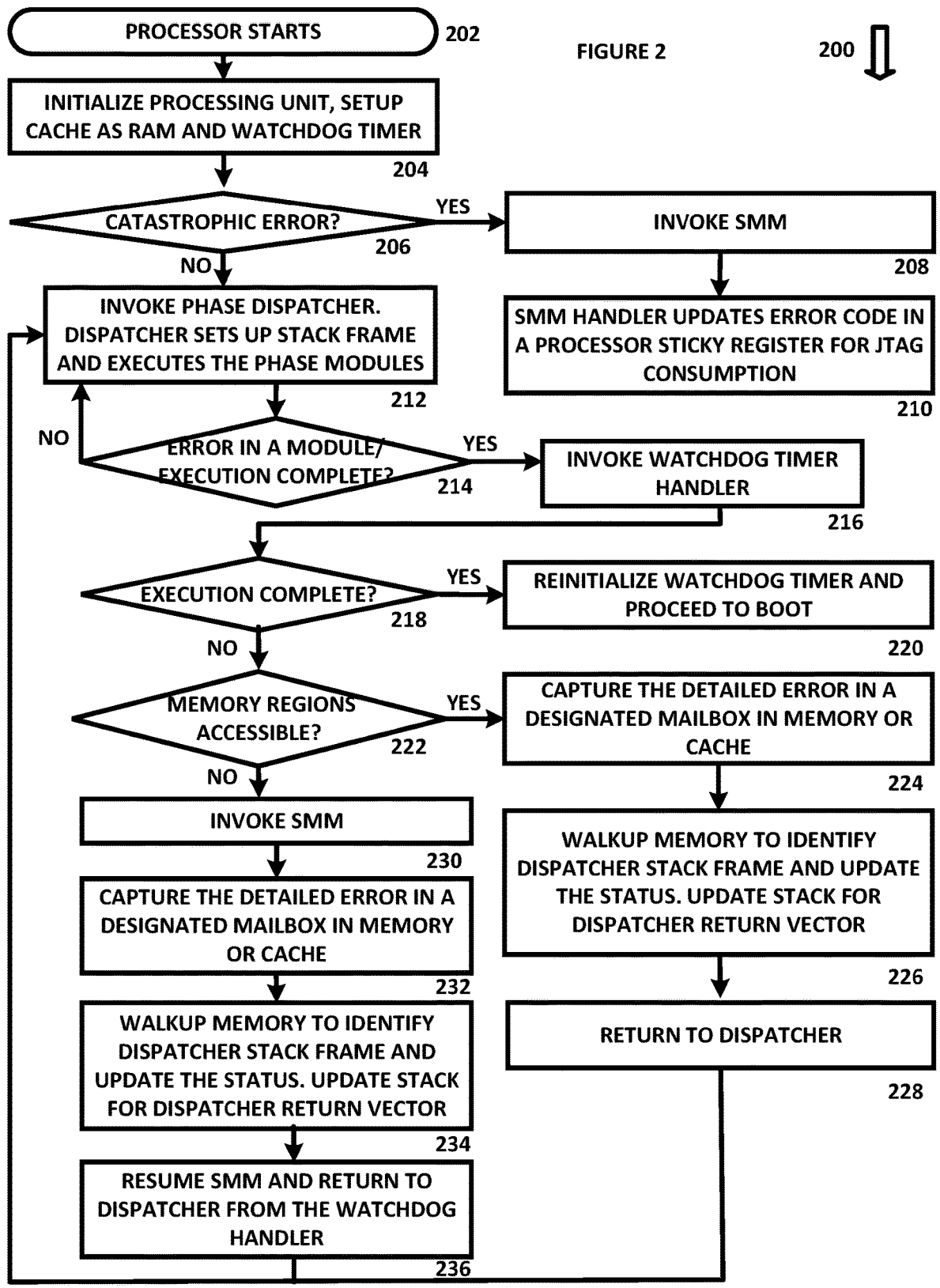
FIG. 2 is a flow chart of an algorithm for providing a fault tolerant and diagnostic boot, in accordance with an example embodiment of the present disclosure.

FIG. 2 is a flow chart of an algorithm 200 for providing a fault tolerant and diagnostic boot, in accordance with an example embodiment of the present disclosure. Algorithm 200 can operate on one or more processors.

Algorithm 200 begins at 202, where a processor is started from a shutdown state. In one example embodiment, the processor can read basic input/output system (BIOS) code from a data storage device such as flash store 108 and can load the BIOS code into a processor random access memory space or other suitable devices. The algorithm then proceeds to 204.

At 204, the processor is initialized, RAM memory is allocated for use as a cache memory and a watchdog timer system such as WDT 122 or other suitable systems are initialized, such as by executing code that causes instructions to be defined and transmitted over a system bus or other suitable communications media. Other suitable functions can also or alternatively be performed. The algorithm then proceeds to 206.

At 206, it is determined whether a catastrophic error has occurred, such as a failure of the processor to initialize, a failure of the memory to form a cache, a failure of the watchdog timer to start or other catastrophic failures. In one example embodiment, a catastrophic error can be detected by executing one or more algorithms on the processor to monitor the watchdog timer for a predetermined output and to compare that output or other suitable data to expected outputs or data, where a catastrophic failure is determined to have occurred when the algorithm determines that the data that has been received does not match data that is expected. If it is determined that a catastrophic failure has occurred, the algorithm proceeds to 208, otherwise the algorithm proceeds to 212.

At 208, the SMM is invoked, such as by loading SMM handler code into the processor for execution or in other suitable manners. The algorithm then proceeds to 210 where the SMM handler updates error code in the processor sticky register for joint test action group (JTAG) device use, such as to analyze the state of the device and to determine the source of the error.

At 212, a phase dispatcher is invoked to control a phase of startup operations. The phase dispatcher sets up a stack frame and then executes phase modules, such as by loading the phase module code into memory and monitoring the code for completion. The algorithm then proceeds to 214.

At 214, it is determined whether there has been an error in a module or if execution is complete. If there has not been an error in a module and if execution is not complete, the algorithm returns to 212 where the next module in the stack frame is executed, otherwise the algorithm proceeds to 216.

At 216, a watchdog timer handler is invoked. In one example embodiment, the watchdog timer can be an independent hardware module operating in a PCH subsystem, or other suitable watchdog timers can also or alternatively be implemented. The watchdog timer handler can be implemented as a handler algorithm that facilitates control of the watchdog timer or other suitable algorithms. The algorithm then proceeds to 218.

At 218, it is determined whether execution is complete. If execution is complete, the algorithm proceeds to 220, where the watchdog timer is reinitialized and the processor proceeds to boot. If execution is not complete, the algorithm proceeds to 222.

At 222, it is determined whether memory regions are accessible. If it is determined that memory regions are accessible, the algorithm proceeds to 224, otherwise the algorithm proceeds top 230.

At 224, detailed error data is generated and captured for storage in a designated mailbox in a memory device or the cache. In one example embodiment, a sub-algorithm can be used to control the generation and capture of the error data, such as by retrieving the error data from a predetermined cache memory location and transferring the error data to a different predetermined storage location, such as random access memory storage, cache storage, external long-term data storage or other suitable storage. The algorithm then proceeds to 226.

At 226, the processor walks up the memory stack to identify the phase dispatcher stack frame and updates the status. In addition, the stack is further updated to provide for the phase dispatcher return vector. The algorithm then proceeds to 228, where the algorithm next returns to the phase dispatcher at 212.

At 230, the SMM is invoked, and the algorithm proceeds to 232, where detailed error data is generated and captured for storage in a designated mailbox in a memory device or the cache. In one example embodiment, a sub-algorithm can be used to control the generation and capture of the error data, such as by retrieving the error data from a predetermined cache memory location and transferring the error data to a different predetermined storage location, such as random access memory storage, cache storage, external long-term data storage or other suitable storage. The algorithm then proceeds to 234.

At 234, the processor walks up the memory stack to identify the phase dispatcher stack frame and updates the status. In addition, the stack is further updated to provide for the phase dispatcher return vector. The algorithm then proceeds to 236, where the SMM is resumed, and the algorithm then returns to the phase dispatcher at 212 from the watchdog handler.

In operation, algorithm 200 allows an error to be identified and recovery to be implemented. While algorithm 200 is shown as a flow chart, it can also or alternatively be implemented as two or more flow charts, one or more objects or agents, one or more state diagrams, on one or more processors or other devices, or in other suitable manners.

Figure 3:
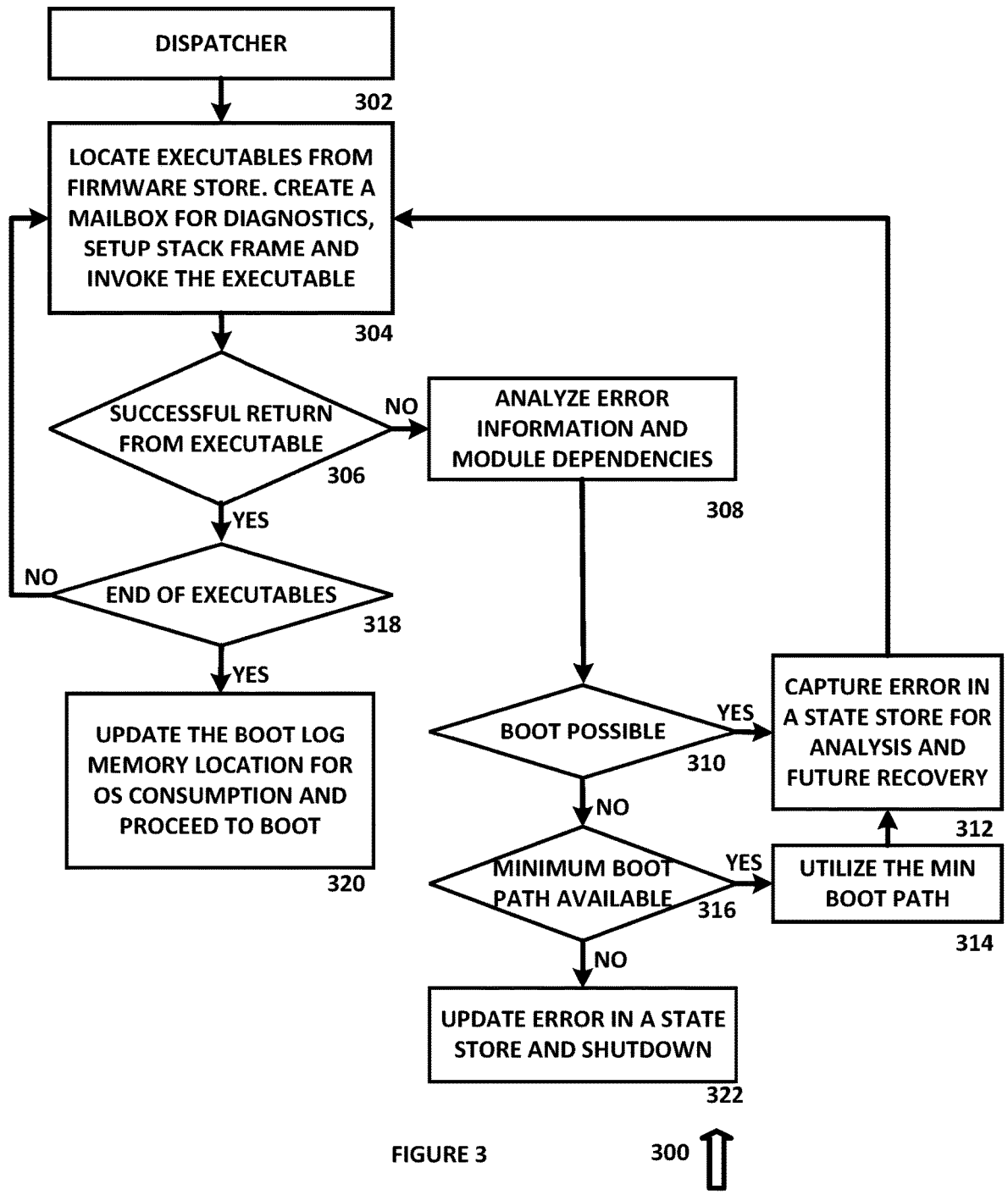
FIG. 3 is a flow chart of an algorithm for providing a fault tolerant and diagnostic boot, in accordance with an example embodiment of the present disclosure.

FIG. 3 is a flow chart of an algorithm 300 for providing a fault tolerant and diagnostic boot, in accordance with an example embodiment of the present disclosure. Algorithm 300 can operate on one or more processors.

Algorithm 300 begins at 302, where a dispatcher module is actuated, such as by loading dispatcher algorithm code from a memory device into a processor working memory. The algorithm then proceeds to 304.

At 304, executables associated with the dispatcher module are located from a firmware store. In addition, a mailbox is created for diagnostics, such as a predefined memory location for error messages, diagnostic messages and other suitable messages. A stack frame for the executable is setup and used to invoke the executable, such as a frame of data that represents a function call with associated argument data and a function return address.

At 306, it is determined whether a successful return from the executable has occurred. If a successful return has not occurred, then the algorithm proceeds to 308, otherwise it proceeds to 318 where the algorithm determines whether an end of the executable has been reached. If the end of the executables has not been reached, the algorithm returns to 304, otherwise the algorithm proceeds to 320 where the boot log memory location is updated for the operating system consumption, and the processor proceeds to boot.

At 308, error information and module dependencies are analyzed, such as parsing an error log to identify predetermined error messages and associated data fields, and analyzing module variables, addresses and other suitable identifiers. The algorithm then proceeds to 310, where it is determined whether is possible to continue with booting the processor. If it is determined that booting the processor is not possible, the algorithm proceeds to 312 where captured error messages and data are saved to a state store memory for analysis and future recovery, and the algorithm returns to 304. If it is determined that booting the processor is possible, then algorithm proceeds to 316.

At 316, it is determined whether a minimum boot path is available, such as by determining whether minimum boot path data that identifies the minimum systems needed for a successful processor boot are available, or in other suitable manners. If it is determined that a minimum boot path is available, the algorithm proceeds to 314 where the minimum boot path is utilized, and the algorithm proceeds to 312. Otherwise, the algorithm proceeds to 322.

At 322, the error data in the state store memory is updated, and the processor is shutdown. Any further activity with the processor requires manual intervention, at which time the error data can be manually analyzed.

In operation, algorithm 300 allows an error to be identified and recovery to be implemented to allow a processor to continue with booting, or error data to be stored for subsequent manual analysis. While algorithm 300 is shown as a flow chart, it can also or alternatively be implemented as two or more flow charts, one or more objects or agents, one or more state diagrams, on one or more processors or other devices, or in other suitable manners.

Figure 4:
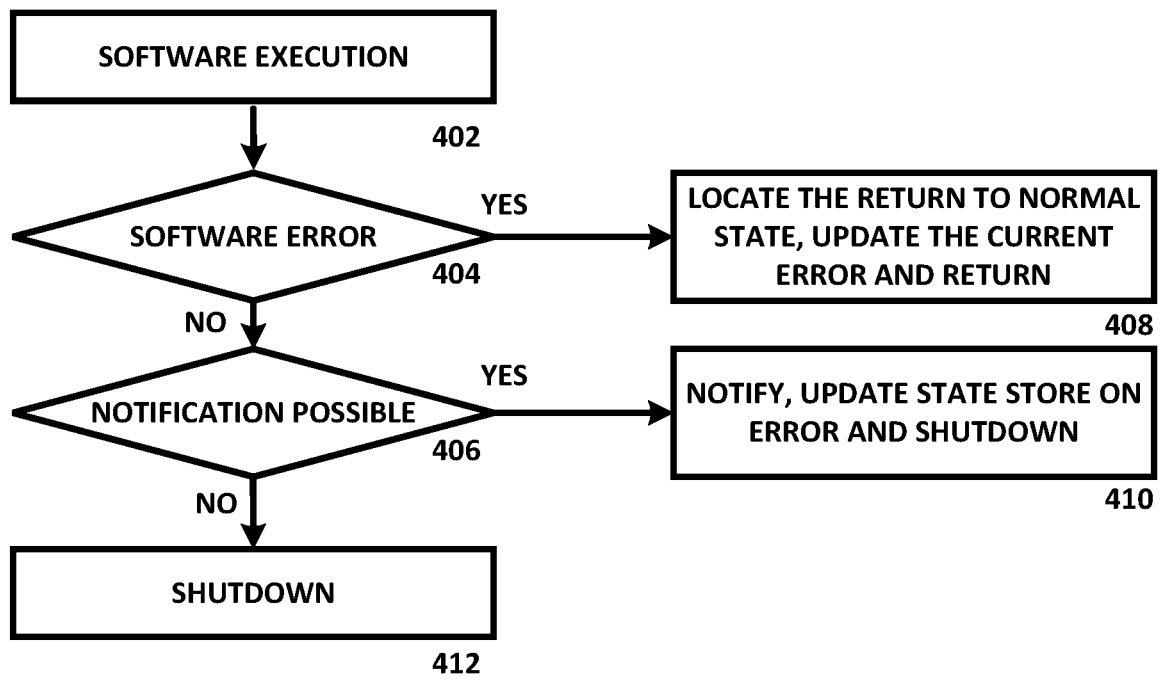
FIG. 4 is a flow chart of an algorithm for providing a fault tolerant and diagnostic boot, in accordance with an example embodiment of the present disclosure.

FIG. 4 is a flow chart of an algorithm 400 for providing a fault tolerant and diagnostic boot, in accordance with an example embodiment of the present disclosure. Algorithm 400 can operate on one or more processors.

Algorithm 400 begins at 402, where software execution is initiated. The algorithm then proceeds to 404, where it is determined whether there has been a software error. If an error has occurred, the algorithm proceeds to 408 where it locates the return to normal state, updates the current error and returns. Otherwise, the algorithm proceeds to 406.

At 406, it is determined whether notification is possible. If notification is not possible, the algorithm proceed to 412 and shuts down, otherwise it proceeds to 410 where the algorithm generates a notification, such as by generating a message for transmission to a predetermined address or storage in a predetermined memory location. The algorithm also updates state data storage to include the error data, and shuts down.

In operation, algorithm 400 allows an error to be identified and error data to be provided using a notification process. While algorithm 400 is shown as a flow chart, it can also or alternatively be implemented as two or more flow charts, one or more objects or agents, one or more state diagrams, on one or more processors or other devices, or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for processing data, comprising:
starting a processor from an off state;
loading watchdog timer handler code into a processor memory;
executing the watchdog timer handler code;
determining whether a catastrophic error has occurred during execution of the watchdog timer handler code;
updating error code if it is determined that the catastrophic error has occurred; and
setting up a first stack frame associated with a first phase if it is determined that a catastrophic error has not occurred.

2. The method of claim 1 further comprising:
determining whether an error has occurred during execution of the first stack frame associated with the first phase; and
invoking a watchdog timer handler if the error has occurred during execution of the first stack frame.

3. The method of claim 1 further comprising:
determining whether a minimum boot path exists after execution of the first stack frame associated with the first phase; and
booting the processor using the minimum booth path if the minimum boot path exists.

4. The method of claim 1 further comprising setting up a second stack frame associated with a second phase if it is determined that a catastrophic error has not occurred during the first phase.

5. The method of claim 4 further comprising:
determining whether a minimum boot path exists after execution of the second stack frame associated with the second phase; and
booting the processor using the minimum booth path if the minimum boot path exists.

6. The method of claim 1 further comprising setting up a plurality of additional stack frames if it is determined that a catastrophic error has not occurred during a preceding phase.

7. The method of claim 6 further comprising:
determining whether a minimum boot path exists after execution of a last stack frame associated with a last phase; and
booting the processor using the minimum booth path if the minimum boot path exists.

8. The method of claim 1 further comprising:
determining whether execution of the first phase is complete; and
reinitializing a watchdog timer if execution of the first phase is complete.

9. The method of claim 8 further comprising:
determining whether memory regions are accessible if execution of the first phase is not complete; and
capturing error data if it is determined that the memory regions are not accessible.

10. The method of claim 8 further comprising:
determining whether memory regions are accessible if execution of the first phase is not complete; and
capturing a detailed error if it is determined that the memory regions are accessible.

11. A system for processing data, comprising:
a processor configured to perform predetermined actions when starting from an off state, the actions including:
load watchdog timer handler code into a processor memory;
execute the watchdog timer handler code;
determine whether a catastrophic error has occurred during execution of the watchdog timer handler code;
update error code if it is determined that the catastrophic error has occurred; and
set up a first stack frame associated with a first phase if it is determined that a catastrophic error has not occurred.

12. The system of claim 11, wherein the processor is further configured to:
determine whether an error has occurred during execution of the first stack frame associated with the first phase; and
invoke a watchdog timer handler if the error has occurred during execution of the first stack frame.

13. The system of claim 11, wherein the processor is further configured to:
determine whether a minimum boot path exists after execution of the first stack frame associated with the first phase; and
boot the processor using the minimum booth path if the minimum boot path exists.

14. The system of claim 11 wherein the processor is further configured to set up a second stack frame associated with a second phase if it is determined that a catastrophic error has not occurred during the first phase.

15. The system of claim 11 wherein the processor is further configured to:
determine whether a minimum boot path exists after execution of the second stack frame associated with the second phase; and
boot the processor using the minimum booth path if the minimum boot path exists.

16. The system of claim 11 wherein the processor is further configured to set up a plurality of additional stack frames if it is determined that a catastrophic error has not occurred during a preceding phase.

17. The system of claim 16 wherein the processor is further configured to:
determine whether a minimum boot path exists after execution of a last stack frame associated with a last phase; and
boot the processor using the minimum booth path if the minimum boot path exists.

18. The system of claim 11 wherein the processor is further configured to:
determine whether execution of the first phase is complete; and
reinitialize a watchdog timer if execution of the first phase is complete.

19. The system of claim 18 wherein the processor is further configured to:
determine whether memory regions are accessible if execution of the first phase is not complete; and
capture error data if it is determined that the memory regions are not accessible.

20. A method for processing data, comprising:
starting a processor from an off state;
loading watchdog timer handler code into a processor memory;
executing the watchdog timer handler code;

determining whether a catastrophic error has occurred during execution of the watchdog timer handler code;

updating error code if it is determined that the catastrophic error has occurred;

setting up a first stack frame associated with a first phase if it is determined that a catastrophic error has not occurred; and booting the processor after execution of the first stack frame associated with the first phase.

\* \* \* \* \*